(12) United States Patent
Yu

(10) Patent No.: US 6,674,107 B1
(45) Date of Patent: Jan. 6, 2004

(54) ENHANCEMENT MODE JUNCTION FIELD EFFECT TRANSISTOR WITH LOW ON RESISTANCE

(75) Inventor: Ho-Yuan Yu, Saratoga, CA (US)

(73) Assignee: Lovoltech, Inc., Santa Clara, CA (US)

( * ) Notice: Subject to any disclaimer, the term of this patent is extended or adjusted under 35 U.S.C. 154(b) by 0 days.

(21) Appl. No.: 09/453,136

(22) Filed: Dec. 2, 1999

Related U.S. Application Data
(60) Provisional application No. 60/111,197, filed on Dec. 7, 1998.

(51) Int. Cl.⁷ ........................ H01L 29/80; H01L 31/112
(52) U.S. Cl. ........................ 257/266; 257/263; 257/264; 257/287
(58) Field of Search ............................... 257/263, 264, 257/266, 287

(56) References Cited

U.S. PATENT DOCUMENTS 3,381,188 A * 4/1968 Zuleeg et al. ............... 257/266
4,404,575 A * 9/1983 Nishizawa .................. 257/266

* cited by examiner

Primary Examiner—Steven Loke
(74) Attorney, Agent, or Firm—Wagner, Murabito & Hao LLP

(57) ABSTRACT

A normally "off" enhancement mode junction field effect transistor (JFET) is disclose. The JFET has a low threshold voltage in the range of 0.2 to 0.3 volts and a low on resistance. The Drain-to-Source voltage drop is less than 0.1 volt at a drain current of 100 amperes.

8 Claims, 6 Drawing Sheets

NORMALLY "OFF" JFET

SYMBOLS OF NORMALLY "ON" AND NORMALLY "OFF" JFETs AND MESFETs. PAGE 323, S. M. SZE, "PHYSICS OF SEMICONDUCTOR DEVICES", 2ND EDITION, JOHN WILEY & SONS, 1981

NORMALLY "OFF" JFET

DEVICE DIAGRAM

HALF WAVE RECTIFYING CIRCUIT

EQUIVALENT CIRCUIT OF FIGURE 4

FULL WAVE RECTIFYING CIRCUIT

ENHANCEMENT MODE JUNCTION FIELD EFFECT TRANSISTOR WITH LOW ON RESISTANCE

This application claims a priority date of Dec. 7, 1998, benefited from a previously filed Provisional Application No. 60/111,197 filed on Dec. 7, 1998 by a same Inventor of this Patent Application.

BACKGROUND OF THE INVENTION

1. Field of the Invention

This invention relates to the rectifying of alternating current (AC) into direct current (DC) by a normally "offs" Junction Field Effect Transistor (JFET) that provides very low voltage drop across the source and drain for AC to DC power supplies or converters in low voltage application. The gate of this device is connected to the higher voltage terminal of three output terminals of the transformer. The gate turns-on the JFET when the gate is in forward bias above the threshold voltage of the normally "off" JFET. Since the threshold voltage of this normally "off" JFET can be set below 0.3V and the forward bias of 0.5V or less at the gate can sufficiently turn-on the device, a very low voltage drop to below 0.1 V across source and drain of the device can be realized at on state of this device. The current required to switch the device is only two to five times of orders of magnitude smaller than the current across the source and drain. Therefore very efficient rectifying for low voltage application is achieved.

2. Description of the Prior Art

As the technology moves toward deep submicron ranges, the required power supply voltage is decreased from 2.5V for 0.25 micron technology to under 1.0V for 0.13 micron or advanced technology. A Normal P-N junction with a forward voltage drop of 0.8 V to over 1.0 V is no longer adequate for power supplies with output voltages of 5.0 V or lower due to its high power consumption during forward current flow. The standard Schottky rectifier is also not adequate for a power supply voltage below 3.3 V. Special Schottky rectifiers offer a low forward voltage drop of about 0.3 V, however, this kind of Schottky rectifier is limited to 100 degree C. maximum junction temperature and its high reverse leakage current becomes unattractive to many applications.

The concept of Junction Field Effect Transistors (JFET) has been proposed after the invention of bipolar transistors. Due to its majority carrier nature, the JFET can be operated at very high frequency. However, because of its physical properties, this kind of device is only available in the market for normally "on" JFET. This means that the normally "on" JFET is at "on" state when there is no bias applied to the gate. At the reverse bias higher than the threshold voltage Vt, the gate turns off the current flow between source and drain. Without readily available normally "off" JFETs, JFETs are not widely used as the MOSFETs (Metal-Oxide-Semiconductor Field Effect Transistors). In order to make the normally "off" FET, the distance between the gates must be small enough so that the depletion regions from both gates fill up the conduction channel. No current flows when the gate is at zero bias. This means that at forward bias above the threshold voltage of the gate, the depletion region is small enough, the conduction channel between source and drain is then open.

S. M. Sze has clearly described this concept in page 323, "Physics of Semiconductor Devices", $2^{nd}$ edition, John Wiley & Son, 1981. The symbols for n-type and p-type normally "on" and normally "off" JFET and MESFET are illustrated in FIG. 1. However, in this book, the application of normally "off" FET is described for high speed and low power application. Since the original device structure has very long channel length that limits the current carrying capability and high on resistance.

From inventor's previous invention concepts, "Low On Resistance Transistors and the Method of Making" filed in Patent Office of Disclosed Document Program, Sep. 24, 1998, #444899, has disclosed the device structure for high current and low on resistance applications. This is a normally "on" JFET that offers high current and low on resistance for low voltage applications. Inventor's other concept, "Novel Structure of JFETs for Low Voltage Application", filed/in Patent Office of Disclosed Document Program, Sep. 17, 1998, #444874 disclose/d the device structure of normally "off" JFETs for low voltage and high current applications. The provisional patent application, No. 60/115,009, has been filed on Jan. 6, 1999 and utility patent application, was filed on Oct. 28, 1999.

SUMMARY OF THE PRESENT INVENTION

From the inventor's previous invention concepts, 1) "Low On Resistance Transistors and the Method of Making", filed in the Patent Office Disclosure Document Program, Sep. 24, 1998, #444899, has disclosed the device structure for high current and low on resistance applications. This is a normally "on" JFET that offers high current and low on resistance for low voltage applications. The Inventor's other concept, "Novel Structure of JFETs for Low Voltage Application", filed in the Patent Office Disclosure Document Program, Sep. 17, 1998, #444874, disclosed the device structure of normally "off" JFETs for low voltage and high current applications. The above two documents have been combined together to file a provisional patent application, No. 60/115,009 on Jan. 6, 1999 and a subsequently filed utility patent application Ser. No. 09/430,500 on Oct. 29, 1999. The full disclosures of application Ser. No. 60/115,009 and application Ser. No. 09/430,500 are incorporated herein by reference.

This invention offers simple circuits connecting to the output side of the transformer by utilizing the normally "off" JFET for half wave or full wave rectifying. Similar approach can also apply to other complicated circuitry.

DETAILED DESCRIPTION OF THE PREFERRED EMBODIMENT

Figure 1:
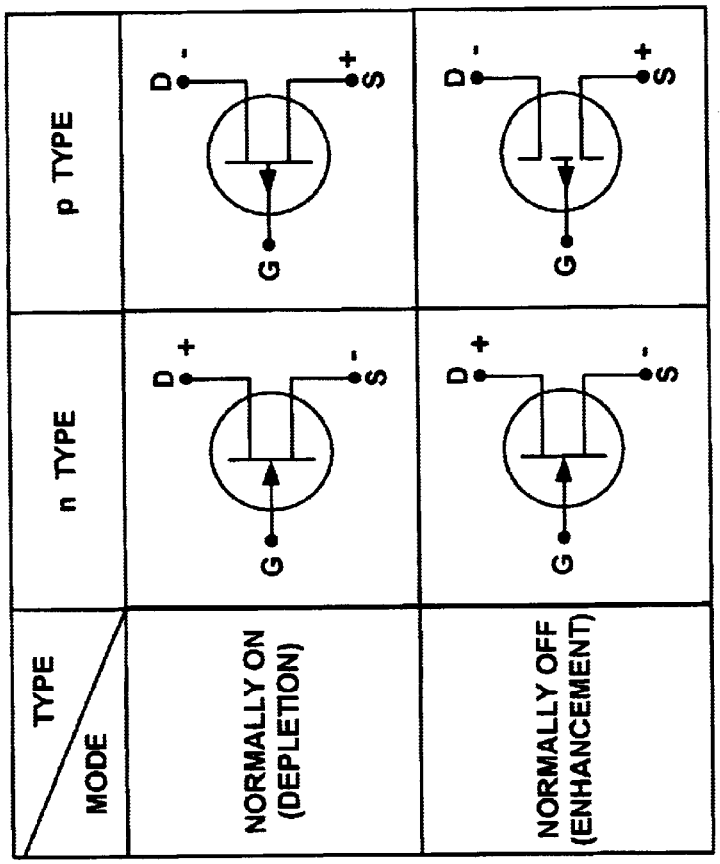
FIG. 1 shows the symbols of normally "on" and normally "off" JFETs and MESFETs for both N and P channels selected from page 323 of S. M. Sze, "Physics of Semiconductor Devices", $2^{nd}$ edition, John Wiley & Sons, 1981.
Figure 2:
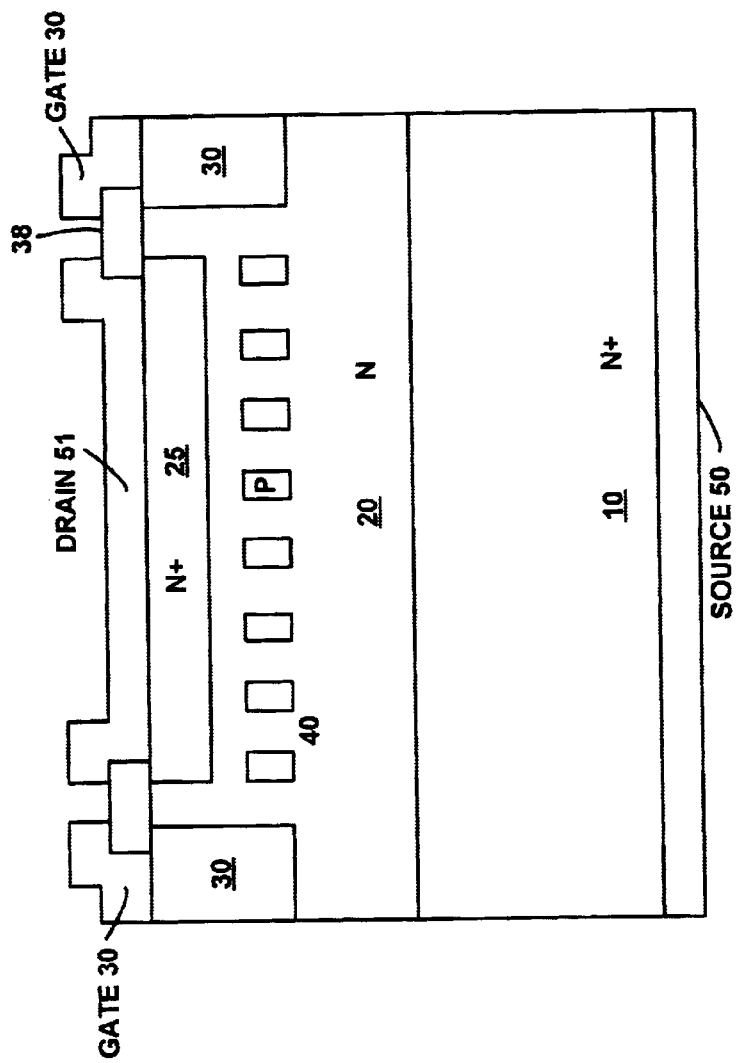
FIG. 2 illustrates the basic device structure for normally "off" FET.

FIG. 2 illustrates a normally "off" Junction Field Effect Transistor. An epitaxial layer 20 of same doping polarity is deposited on the top of heavily doped substrate 10. The control gate 30 is made by implant/diffusion, trench/doping material deposition, or double epitaxial process. A simple implant/diffusion method is shown in FIG. 2. The gate 30 is done by lithography and implant process. A layer of heavily implanted region 25 of same polarity of the epitaxial layer 20 is placed on the top of the gate grid. The purpose of region 25 is to form the ohmic contact to the drain 51. The gate is connected to the surface of the silicon wafer by connection implant or trench etch method. The oxide layer 38 is used to separate the gate 30 and drain 51. This oxide layer can be formed by thermal oxidation or by chemical vapor deposition of silicon dioxide. Drain 51 is formed by metallization process on the top of heavily doped N+ layer 25. The source 50 is formed by metallization process to the bottom of N+ substrate. This is an N-channel normally "off" JFET. By substituting the substrate 10 with P+, epitixial layer 20 with P type material, gate grid 30 with N type doping and the connection layer 25 with P+ doping, a P-channel normally "off" JFET is formed. The width W 40, distance between the gate grid 30, is determined by the lithography and the thermal process. By altering the width W 40 or channel doping concentration, the threshold voltage Vt can be adjusted. In order to achieve the normally "off" JFET, the width W must be sufficiently small that the conduction channel is filled up by the depletion regions from both sides of the gate grid 30. The channels between source 50 and drain 51 are turned-off when no voltage is applied to the gate in this condition. Only forward bias above the threshold voltage at the gate 30 can reduce the depletion regions from both side of the gate grid 30 to open the conduction channels between the source 50 and drain 51. However, the current flow from the gate grid to the source and drain is insignificant when the forward voltage is below 0.5V for silicon P-N junction. Therefore, large current gain can be obtained by this structure.

Figure 3:
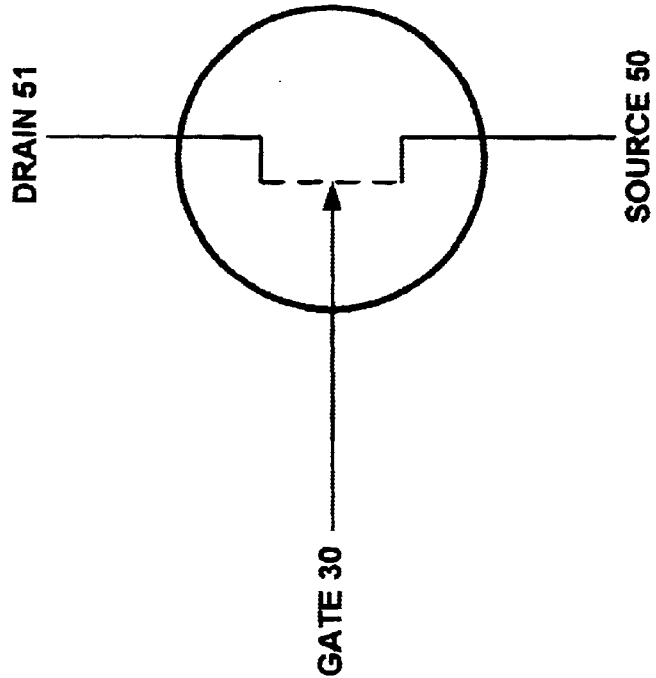
FIG. 3 shows the device structure for normally "off" FET.

FIG. 3 is the device diagram of this normally "off" JFET. The source 50 is located at the bottom of the device and drain 51 is located at the top of the device. This is an N-channel JFET. When the current flows from the gate 30 to source 50 and drain 51 in forward bias, the depletion layer between the gate grid leave a conduction path for the source and drain. This is the principle of current amplification action. With proper design of the device, the current gain can be 100 to over 10,000. When the gate voltage is less than the threshold voltage Vt or at reverse bias, this device is turned off.

Figure 4:
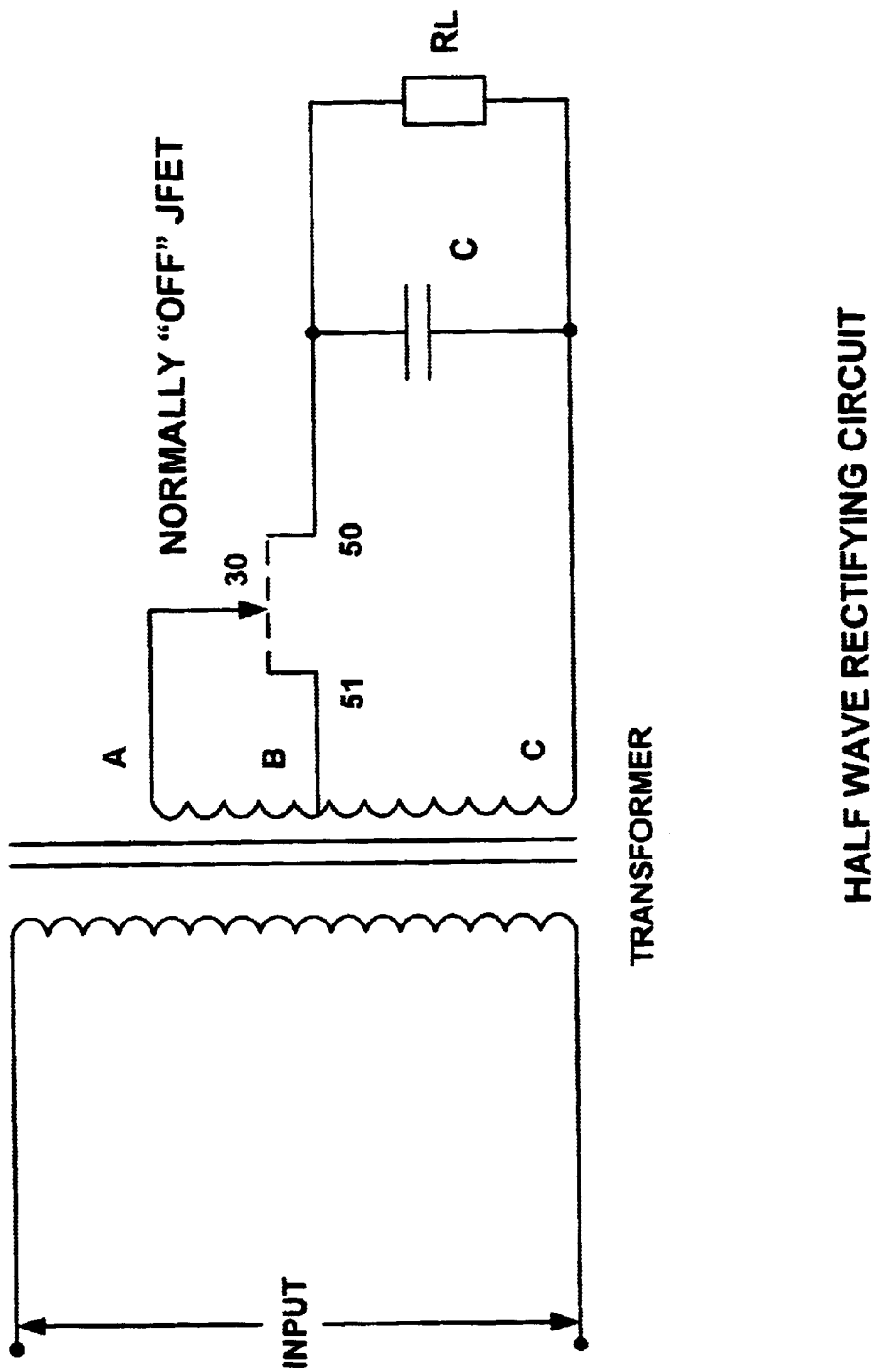
FIG. 4 discloses the circuitry connecting this normally "off" FET to the terminals of the output side of the transformers, by adding extra turns of coil higher bias is provided to the gate, thus, the device turn-on action is achieved.

FIG. 4 illustrates the half wave rectifier circuit. The input voltage is an AC source or a DC source switched by the switching transistor. Assuming that the transformer is a step-down version, at the output terminal of the transformer, an extra terminal A is added by additional coil winding to the output side of the transformer. By adjusting the ratio of the winding of AB and BC terminals, higher bias from both directions between the gate to source and gate to drain can be achieved. The drain 51 of the device is connected to the terminal B and the source 50 of the device is connected to the load. A capacitor C is connected between the source 50 and the terminal C. The load RL is connected to the source side of the JFET and the terminal C in parallel with the capacitor C. The capacitor C is used to store the energy when the device is switched on to provide partial DC voltage to the load. By adding extra coils for terminal A, a higher voltage is applied to the gate than the source and drain terminals. When the output transformer provides reverse bias to the gate and the source/drain region, no current flows between the source and drain, as well as between the gate and the device. When the output transformer is in forward bias, the extra forward voltage between the gate to the source/drain turns on the device. In order to protect the over current flowing through the gate, a current limit device can be connected between the gate and upper terminal of the transformer. This current limit device can also be built-in to the normally "off" JFET. A normally JFET without gate structure can be used as the current limiter.

Figure 5:
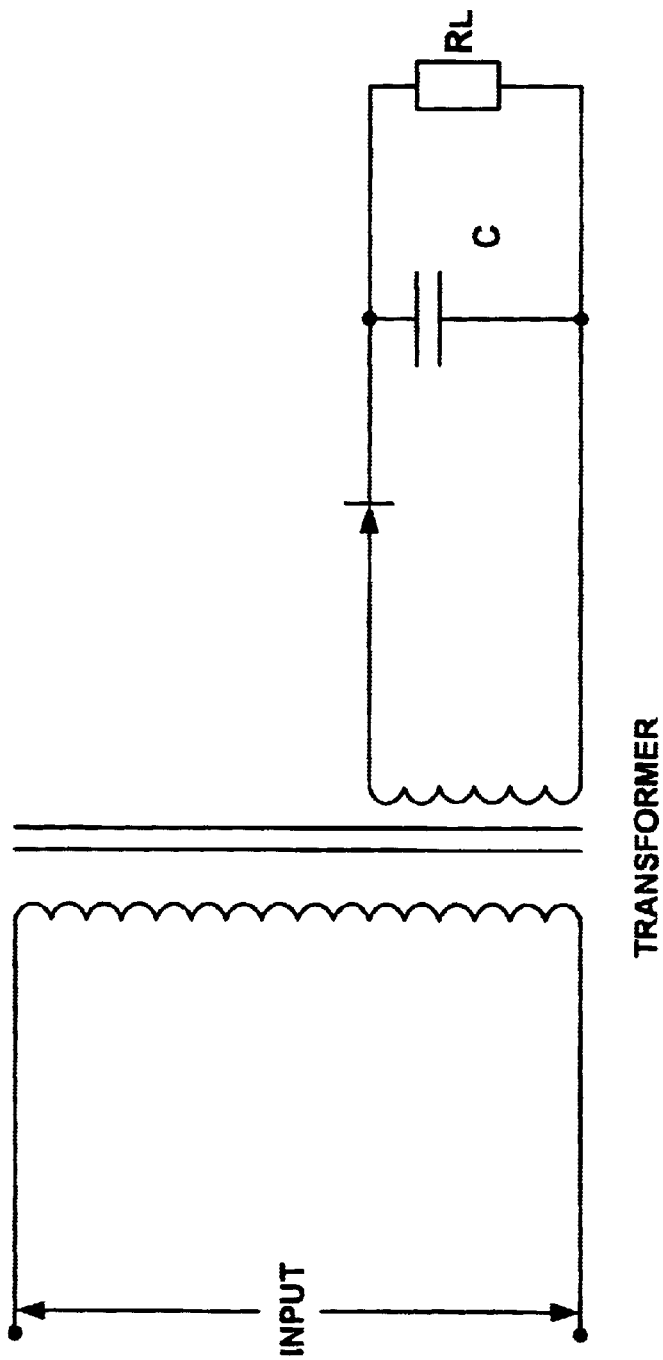
FIG. 5 shows the equivalent circuit of FIG. 4.

FIG. 5 is the equivalent circuit of FIG. 4. A simple diode can be considered as the circuit shown in FIG. 4. However, for normal rectifiers, a P-N junction has the forward voltage drop of 0.9V to over 1V; a normal Schottky rectifier has the forward voltage drop between 0.4V to 0.65V. By using normally "off" JFET, the circuit shown in FIG. 4 can provide the rectifying function to 0.1V or less. This device is a majority device; therefore, the switch speed or the recovery time can be very fast and can be used for high frequency AC to DC conversion.

Figure 6:
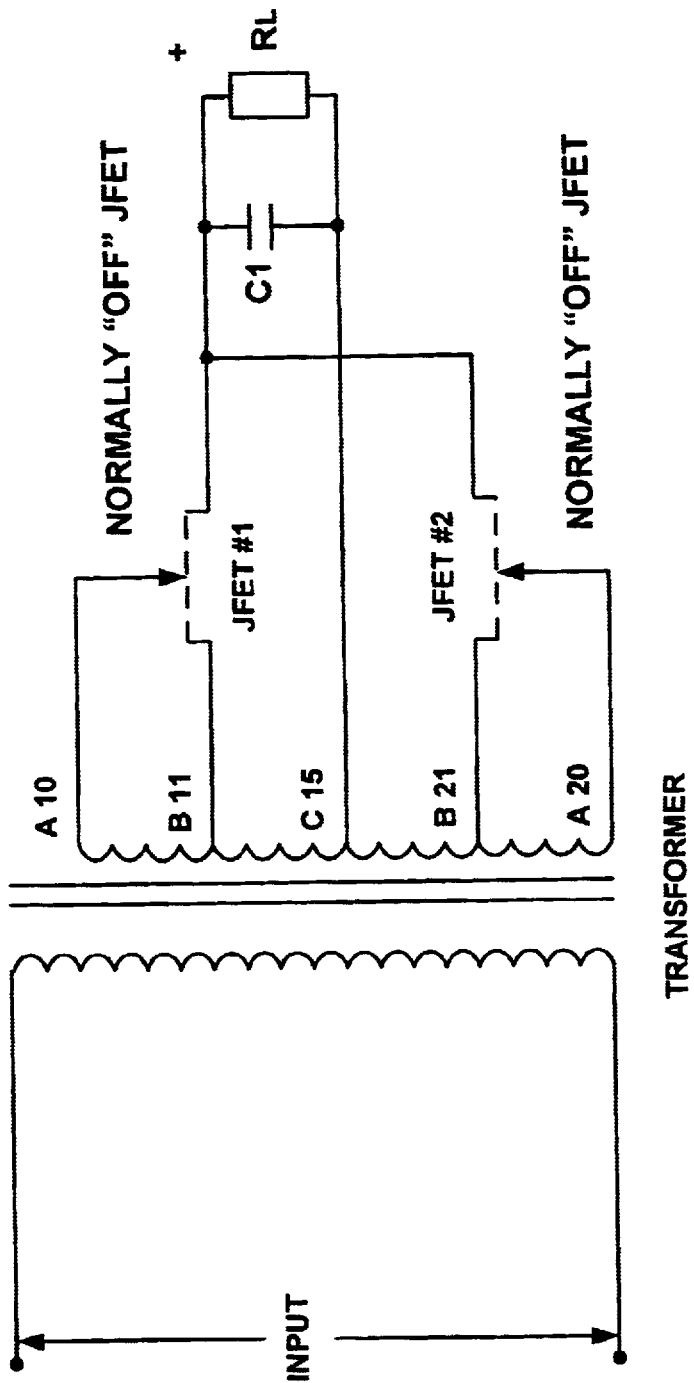
FIG. 6 discloses the circuitry of full wave rectifier using two normally "off" JFETs.

FIG. 6 is a full wave rectifying circuit. The secondary coil of the transformer comprises five terminals. Terminal A 10 provides the bias switching current to turn on the first normally "off" JFET at forward bias above threshold voltage Vt. The current flows from terminal B 11 to charge up the capacitor C1 and returned to the central terminal C 15. When the terminal A 20 is in positive polarity and above the threshold voltage, the second normally "off"JFET is turned-on. The current flows from terminal B 21 to capacitor C1 and returns to the terminal C 15. Thus this circuitry can charge the capacitor in either current directions. This is a very efficient circuitry for the AC to DC or DC to DC conversion especially for the low voltage applications.

With proper design of normally "off" FETs, this invention can provide the rectifying function to more than 100 ampere current with the reverse blocking voltage from 10 to more than 40 volts and the forward voltage drop at "on" state of the JFET to less than 0.1 V.

By using similar principles as illustrated in FIG. 4 and FIG. 6 for other applications in the power supplies and converters such as buck, boost and other complicated circuits. This invention utilizes the natural property of zero voltage switching characteristics of the normally "off" JFETs to achieve rectifying without using sophisticated circuitry.

I claim:

1. An N-channel normally off power junction field effect transistor (JFET) comprising:

a heavily doped N+ substrate;

an epitaxial N layer formed on the top of said N+ substrate;

a drain;

a source disposed at the bottom of said N+ substrate;

a heavily implanted N+ region disposed on said epitaxial N layer to form an ohmic contact for said drain; and a plurality of P-type gate regions implanted into said epitaxial N layer, each gate region separated by a distance, W, wherein a gate having a gate junction is formed at the interface between each of said P-type gale regions and said epitaxial N layer, and wherein the gate junctions, when zero biased, create depletion regions that prevent current flow between said drain and said source and wherein further said gate junctions, when forward biased, reduce said depletion regions to provide a low resistance conduction channel between said drain and said source, said JFET having an on threshold voltage for the voltage between said gate and said source within the range of 0.2 volt and 0.3 volt.

2. A transistor as described in claim 1 wherein said conduction channel exists when said gate junctions are forward biased with respect to both said source and said drain, said conduction channel having a voltage drop between source and drain of below 0.1 volt.

3. A transistor as described in claim 1 wherein said JFET is operable within temperatures up to 200 degrees C.

4. A transistor as described in claim 1 having a drain to source current of at least 100 amperes and a voltage drop between source and drain of below 0.1 volt when a gate junction bias voltage of between 0.5 volt and 0.7 volt is applied.

5. A P-channel normally off power junction field effect transistor (JFET) comprising:
   a heavily doped P+ substrate;
   an epitaxial P layer formed on the top of said P+ substrate;
   a drain;
   a source disposed at the bottom of said P+ substrate;
   a heavily implanted P+ region disposed on said epitaxial P layer to form an ohmic contact for said drain; and
   a plurality of N-type gate regions implanted into said epitaxial P layer, each gate region separated by a distance, W, wherein a gate having gate junction is formed at the interface between each of said N-type gate regions and said epitaxial P layer, and wherein the gate junctions, when zero biased, create depletion regions that prevent current flow between said drain and said source and wherein further said gate junctions, when forward biased, reduce said depletion regions to provide a low resistance conduction channel between said drain and said source, said JFET having an on threshold voltage for the voltage between said gate and said source within the range of −0.2 volt and −0.3 volt. 100 amperes.

6. A transistor as described in claim 5 wherein said conduction channel exists when the gate junctions are forward biased with respect to both said source and said drain.

7. A transistor as described in claim 5 wherein said JFET is operable within temperatures up to 200 degrees C.

8. A transistor as described in claim 5 having a drain to source current of at least 100 amperes and a voltage drop between source and drain of below 0.1 volt when a voltage between said gate and said source within the range of between −0.5 volt and −0.7 volt is applied.

* * * * *